United States Patent Office 3,223,545
Patented Dec. 14, 1965

3,223,545
DIALKANOL AMIDE ANTISTATIC COMPOSITION FOR POLYOLEFINS
Major L. Gallaugher and James E. Pritchard, Bartlesville, Okla., assignors to Phillips Petroleum Company, a corporation of Delaware
No Drawing. Filed Oct. 8, 1962, Ser. No. 229,227
10 Claims. (Cl. 106—287)

This invention relates to a dialkanol amide antistatic composition for polyolefins. In one aspect the invention relates to the surface treatment of a polymer of a monoolefin with a composition containing a dialkanol amide.

Fibers, films, sheets and molded articles made from resinous polymers of monoolefins are subject to objectional properties resulting from the accumulation of electrostatic charges thereupon. One procedure heretofore disclosed for alleviation of this problem involves incorporation in the resin of certain additives, while another proposed procedure is the direct application of the antistatic materials to the surface of the fabricated article. Numerous problems have been encountered in these operations. Additives incorporated in the resin may undergo decomposition at temperatures employed in fabrication operations thereby rendering them inactive or decomposition products develop therefrom and lead to objectionable color or odor development. On the other hand, the so-called "wipe-on" antistatic materials heretofore used may be lost from the surface either by evaporation or oxidative changes or by mechanical abrasion effects encountered in handling, shipping, storage and the like. Further, it has been found that materials successful in eliminating the accumulation of electrostatic charges for one type of resin may be much less effective for another type of resin. For example, antistatic materials which are highly satisfactory for low density polyethylene are frequently much less effective for high density polyethylene.

It is an object of the invention to provide a novel composition of matter effective as an antistatic agent for polymers of monoolefins.

It is another object of the invention to provide a novel article of manufacture whose surface has been treated so as to decrease the tendency of the object to accumulate electrostatic charges.

These and other objects of the invention will be readily apparent to those skilled in the art from the accompanying disclosures and appended claims.

These objects are broadly accomplished by an antistatic composition useful for application to the surface of a solid polymer of a monoolefin comprising a dialkanol amide dispersed in a voltaile inert liquid, said dialkanol amide represented by the structural formula

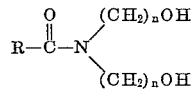

wherein:
R is an alkyl group containing from 6 to 16 carbon atoms, and
$n$ is an integer from 2 to 4.

In one aspect of the invention a novel article of manufacture having reduced tendency to accumulate an electrostatic charge is prepared by applying to the surface of said polymer the hereinbefore described antistatic composition by any suitable method such as by immersion, padding on, spraying on, wiping or the like.

This invention is broadly applicable to the treatment of polymers of monoolefins containing from 2 to 8 carbon atoms per molecule. By the term "polymer" is included herein both homopolymers and copolymers of said monoolefins. Suitable polymers include polyethylene, polypropylene, polybutene, copolymers of ethylene and propylene, ethylene and butene, propylene and butene, and the like. Particularly preferred is a solid polymer of ethylene having a density of at least 0.940 gm./cc., preferably in the range of 0.940 to 0.990 gram/cc. A number of methods have been proposed for the preparation of these high density polyolefins and the invention is not limited to any particular method of preparation. One suitable method of preparation is disclosed in the patent of Hogan and Banks, U.S. 2,825,721, issued March 4, 1958.

It has now been found that the surface of articles fabricated from these polymers of monoolefins may be provided long term protection against the development of electrostatic charges thereon by the surface application of a long chain dialkanol amide, having the general formula hereinbefore proposed, dissolved in a volatile inert liquid. Typical of such dialkanol amide compounds are the diethanol amide of heptanoic acid, the diethanol amide of caprylic acid, the diethanol amide of pelargonic acid, the diethanol amide of decanoic acid, the diethanol amide of lauric acid, the diethanol amide of pentadecanoic acid, the diethanol amide of heptadecanoic acid, the dipropanol amide of heptanoic acid, the dipropanol amide of pelargonic acid, the dipropanol amide of decanoic acid, the dipropanol amide of lauric acid, the dipropanol amide of pentadecanoic acid, the dipropanol amide of heptadecanoic acid, the dibutanol amide of heptanoic acid, the dibutanol amide of caprylic acid, the dibutanol amide of pelargonic acid, the dibutanol amide of decanoic acid, the dibutanol amide of lauric acid, the dibutanol amide of pentadecanoic acid, and the dibutanol amide of heptadecanoic acid. These and other compounds can be made by any suitable method such as by the reaction of an alkanoyl chloride with the desired dialkanol amide. Presently preferred is the diethanol amide of lauric acid which can be prepared by reacting diethanol amine with lauroyl chloride.

These dialkanol amides may be applied to the surface of the article to be treated in any suitable manner. One suitable procedure is the dissolving of the dialkanolamide in an alcohol, such as isopropyl alcohol, and applying the admixture to the surface of the article to be treated with a soft cloth. Another procedure involves spraying the solution on the fabricated article from an atomizing nozzle.

Any volatile inert liquid may be employed which is a solvent for the dialkanol amide, is inert to the polymer and the dialkanol amide and is voltaile at the conditions of application. Suitable materials include alcohols having from 1 to 5 carbon atoms per molecule including methanol, ethanol, propanol, isopropanol, butanol, isobutanol, pentanol, and the like. A particularly suitable mixture comprises from 50 to 98 parts by weight of the volatile inert liquid and from 2 to 50 parts by weight of the dialkanol amide based on the total composition weight.

The solvent evaporates quickly under normal ambient conditions and leaves a strongly adherent coating which will prevent accumulation of electrostatic charges on the article for many months. This is most surprising since most "rub-on" antistatic agents are readily removed by rubbing once or twice with a cloth or by other mechanical abrasion. In addition, this development is most surprising since it has been found that these long chain dialkanol amides are for most practical purposes incompatible with the polyolefins. The incorporation of the dialkanol amide directly into the polymer in a Banbury mixer, roller or extruder thus does not present a favorable avenue for the treatment of the polyolefins. Although the exact mechanism for this surprising development is unknown it would appear that the treating agent in some manner penetrates the surface of the resin or is adsorbed thereon.

Although the antistatic compositions of this invention are comprised substantially of the stated amides and a solvent therefor, the composition may also contain small amounts of other additives, such as antioxidants and others, provided the additional ingredients are not present in amounts sufficient to substantially alter the effectiveness of the stated composition for decreasing the tendency of the polymer for the accumulation of electrostatic charges.

It has been found that the antistatic composition of this invention applied to the surface of a solid polymer of a monoolefin reduces and maintains the electrostatic charges for extended periods of time below a potential of 3 kilovolts. This is generally sufficient to eliminate dust or dirt pick-up.

This invention is best illustrated by reference to the following illustrative examples.

*Example I*

A 6" x 6" x 1/8" slab of high density polyethylene prepared by the method of Hogan et al. supra having a density of 0.96 gm./cc. and a potential of 16 kilovolts was treated by applying a 10 percent by weight solution of the diethanol amide of lauric acid in isopropyl alcohol to the surface. The effectiveness of the treatment was determined by rubbing the slab with a woolen cloth and testing with a Keithly Model 250 static meter fitted with a 2501 detecting head. Periodic tests over a period of 12 months showed zero accumulation of charge and after 14 months only 1 kv. Pick-up of ash was zero for the entire 14 month period. During the period of observation the slab was stored on open shelf and was repeatedly handled and rubbed with cloth thus demonstrating the stability of the antistatic treatment against oxidation changes from the air and mechanical removal from handling.

*Example II*

The efficacy of the antistatic composition after repeated water washing was determined on a polyethylene slab similar to that of Example I. Prior to treatment of both sides with a 10 percent solution of the diethanol amide of lauric acid in isopropanol, the potential was 16 kv. as measured with the Keithly meter. Tests made after 40 hours showed zero potential. The slab was washed with running water and after drying remained at the zero level. Twenty-four hours later it was again washed by rubbing with a wet tissue. After drying, tests with the Keithly meter showed a trace charge of less than 1 kv.

This discovery of the efficacy of the composition of this invention even after repeated washing with water and rubbing is most surprising since it has heretofore been the experience of those skilled in the art that surface destaticizers lack resistance to water washing.

While certain examples, structures, compositions and process steps have been described for purposes of illustration the invention is not limited to these. Variations and modifications within the scope of the disclosure and the claims can readily be effected by those skilled in the art.

What we claim is:

1. A method for destaticizing the surface of a solid polyethylene having a density of at least 0.940 gm./cc. comprising dissolving from 2 to 50 weight parts of the diethanol amide of lauric acid in from 50 to 98 weight parts of isopropyl alcohol based on total composition weight, and applying the resultant solution to at least a portion of said surface in an amount sufficient to reduce the electrostatic potential of said surface to less than 3 kilovolts after drying of said surface to remove volatile matter.

2. An antistatic composition suitable for application to the surface of a solid polymer of ethylene having a density of at least 0.940 gm./cc. consisting essentially of a mixture of from about 50 to about 98 parts by weight of a volatile inert alcohol and about 50 to about 2 parts by weight of the diethanol amide of lauric acid based on total composition weight said alcohol being a solvent for said diethanol amide of lauric acid, inert to said polymer and said diethanol amide of lauric acid, and volatile at the conditions of application of said diethanol amide of lauric acid to said polymer.

3. The composition of claim 2 wherein said alcohol is isopropyl alcohol.

4. An article of manufacture comprising a solid polymer of a monoolefin containing from 2 to 8 carbon atoms per molecule and having at least a portion of its surface coated with a material consisting essentially of a dialkanol amide in an amount sufficient to substantially decrease the tendency of said polymer surface to accumulate electrostatic charges, said dialkanol amide having a structural formula represented by

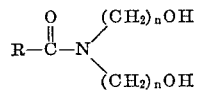

wherein:
R is an alkyl group containing from 6 to 16 carbon atoms, and
n is an integer from 2 to 4.

5. The article of claim 4 wherein said dialkanol amide is present in an amount sufficient to reduce the electrostatic charge to a potential of less than 3 kilovolts.

6. An article of manufacture comprising a solid polyethylene having a density of at least 0.940 gm./cc. having at least a portion of its surface coated with a material consisting essentially of the diethanol amide of lauric acid, said material being present in an amount sufficient to substantially decrease the tendency of said surface to accumulate electrostatic charges.

7. An article of manufacture comprising a solid polyethylene having a density of 0.940 to 0.990 gm./cc. having at least a portion of its surface coated with a material consisting essentially of the diethanol amide of lauric acid, said material being present in amounts sufficient to reduce the electrostatic charge to a potential of less than 3 kilovolts.

8. A method for reducing the tendency of the surface of a solid polymer of a monoolefin containing from 2 to 8 carbon atoms per molecule to accumulate an electrostatic charge comprising applying to at least a portion of said surface a material consisting essentially of a dialkanol amide having the structural form represented by

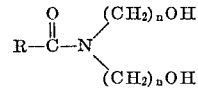

wherein:
R is an alkyl group containing from 6 to 12 carbon atoms, and
n is an integer from 2 to 4,
in an amount sufficient to substantially reduce the tendency of said surface to accumulate electrostatic charges.

9. The method of claim 8 wherein said dialkanol amide is the diethanol amide of lauric acid.

10. The method in accordance with claim 8 wherein said material consists essentially of said dialkanol amide dissolved in a volatile inert liquid, said liquid being a solvent for said dialkanol amide, inert to said polymer and said dialkanol amide, and volatile at the conditions of application of said solution to said polymer, and wherein said material is applied to said surface to coat at least a portion of said surface with an amount of said dialkanol amide sufficient to reduce the electrostatic potential of said surface to less than 3 kilovolts after the thus coated surface is dried to remove volatile matter.

References Cited by the Examiner
UNITED STATES PATENTS

| | | | |
|---|---|---|---|
| 2,257,183 | 9/1951 | Munz | 260—561 |
| 2,727,860 | 12/1955 | Duke et al. | 252—8.8 |

MORRIS LIEBMAN, *Primary Examiner.*